US007058500B2

(12) United States Patent
Meyer et al.

(10) Patent No.: US 7,058,500 B2
(45) Date of Patent: Jun. 6, 2006

(54) METHOD AND SYSTEM FOR DETERMINING CYLINDER POSITION WITH AN INTERNAL COMBUSTION ENGINE

(75) Inventors: Garth M. Meyer, Dearborn, MI (US); Kelvin L. Dobbins, Dearborn, MI (US); George Calvas, Dearborn, MI (US); Venki Nallaperumal, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/936,329

(22) Filed: Sep. 8, 2004

(65) Prior Publication Data

US 2006/0052932 A1 Mar. 9, 2006

(51) Int. Cl.
*G06F 19/00* (2006.01)

(52) U.S. Cl. ...................................... 701/102; 701/115

(58) Field of Classification Search ................ 701/102, 701/114, 115, 116; 324/379
See application file for complete search history.

(56) References Cited

U.S. PATENT DOCUMENTS 5,079,945 A * 1/1992 Hansen et al. ................ 73/116
5,156,125 A * 10/1992 Fukui et al. ........... 123/406.62
5,209,202 A * 5/1993 Maurer et al. .......... 123/406.18
5,269,274 A * 12/1993 Flaetgen et al. ....... 123/406.62
5,469,823 A 11/1995 Ott et al.
5,562,071 A * 10/1996 Urushihata et al. ...... 123/90.15
6,035,826 A 3/2000 Matsuaka
6,202,634 B1 * 3/2001 Siegl .......................... 123/612
6,499,342 B1 12/2002 Gonzales, Jr.
2002/0157641 A1 * 10/2002 Sakakibara ............ 123/406.47
2002/0157649 A1 * 10/2002 Zimmerman et al. ....... 123/478
2002/0189562 A1 * 12/2002 Iizuka et al. ............. 123/90.17
2003/0000293 A1 * 1/2003 Robertson et al. ......... 73/118.1
2004/0011311 A1 * 1/2004 Takahashi ................ 123/90.15

* cited by examiner

*Primary Examiner*—John T. Kwon
(74) *Attorney, Agent, or Firm*—Diana D. Brehob; Richard M. Sharkansky

(57) ABSTRACT

An internal combustion engine having a crankshaft rotatable within an engine block of the engine and at least one camshaft driven by the crankshaft. The crankshaft is fixed to a crankshaft wheel having a plurality of crankshaft wheel marks and at least one crankshaft position indicia. The camshaft is fixed to a camshaft wheel having a predetermined pattern of camshaft wheel marks. A crankshaft sensor is fixed to the engine block for producing a crankshaft signal in response to detection of the crankshaft position indicia. A camshaft sensor is fixed to the engine block for producing camshaft signals in response to detection of the camshaft wheel marks. Rotation of the crankshaft generates a pattern comprising the crankshaft signal and the camshaft signals. A processor compares the generated pattern to a stored reference pattern for determining from such comparison the position of the crankshaft within the engine block.

9 Claims, 10 Drawing Sheets

METHOD AND SYSTEM FOR DETERMINING CYLINDER POSITION WITH AN INTERNAL COMBUSTION ENGINE

TECHNICAL FIELD

This invention relates generally to a method and system for determining cylinder position within the engine, and more particularly for enabling rapid starting of the engine from such cylinder position determination.

BACKGROUND

As is known in the art, engine position is conventionally determined using crankshaft position information. The crankshaft position information is typically produced using a toothed wheel with a missing tooth, so that an engine control module can determine relative engine position to each cylinder. However, since the crankshaft rotates twice per engine cycle, information for the crankshaft can only locate engine position to one of two possibilities. To determine the unique engine position, additional information is used. Typically, this information is provided from a cylinder identification (CID) signal coupled to a camshaft. Thus, the engine control module can therefore uniquely determine relative engine position to each cylinder.

During conventional engine starting, the engine control module waits to receive the CID signal before commencing sequential fuel injection, since sequential fuel injection requires unique identification of engine position. In other words, since the CID signal is provided only once per 2 revolutions of the engine, it takes a certain amount of time to uniquely determine engine position. Therefore, there is a certain delay time before sequential fuel injection can commence. Such a system is described in U.S. Pat. No. 5,548,995. Since it can take as many as 2 engine revolution before sequential fuel injection can commence, increased starting time can occur, which degrades customer satisfaction. Conventional approaches in reducing engine start time require injection of fuel using all fuel injectors simultaneously (not sequential), since unique engine position is unknown, and any cylinder may be on an induction stroke drawing in fuel and air. A disadvantage with injecting into all cylinders is that it may be an unfavorable time to receive fuel for some of the cylinders. In particular, it may be a long time until a given cylinder undergoes an induction. The fuel remains in the port area and wets port walls, leading to puddling. Then, when the induction stroke occurs, an inappropriate amount of fuel is inducted, leading to misfire in the extreme and to higher emissions due to poor air-fuel ratio control. To overcome this, one measure is to inject more fuel into all cylinders to ensure there is enough for the leanest cylinder. If engine position can be more quickly determined, it may be possible to reduce the amount of fuel injected into cylinders not currently inducting fuel and air while providing acceptable engine starting times.

SUMMARY

In accordance with the present invention, an internal combustion engine is provided having a crankshaft rotatable within an engine block of the engine and at least one camshaft driven by the crankshaft. The crankshaft is fixed to a crankshaft wheel having a plurality of crankshaft wheel marks and at least one crankshaft position indicia. The camshaft is fixed to a camshaft wheel having a predetermined pattern of camshaft wheel marks. A crankshaft sensor is fixed to the engine block for producing a crankshaft signal in response to detection of the crankshaft position indicia. A camshaft sensor is fixed to the engine block for producing camshaft signals in response to detection of the camshaft wheel marks. Rotation of the crankshaft generates a pattern comprising the crankshaft signal and the camshaft signals. A processor compares the generated pattern to a stored reference pattern for determining from such comparison the position of the crankshaft within the engine bock.

In one embodiment, the generated pattern is converted by the processor into a corresponding digital word and wherein the stored reference is a reference digital word and wherein the processor compares the corresponding digital word with the reference digital word to determine the position of the crankshaft within the engine block The invention enables a “quick sync” capability which allowed for accurate fuel placement resulting in lower start emissions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
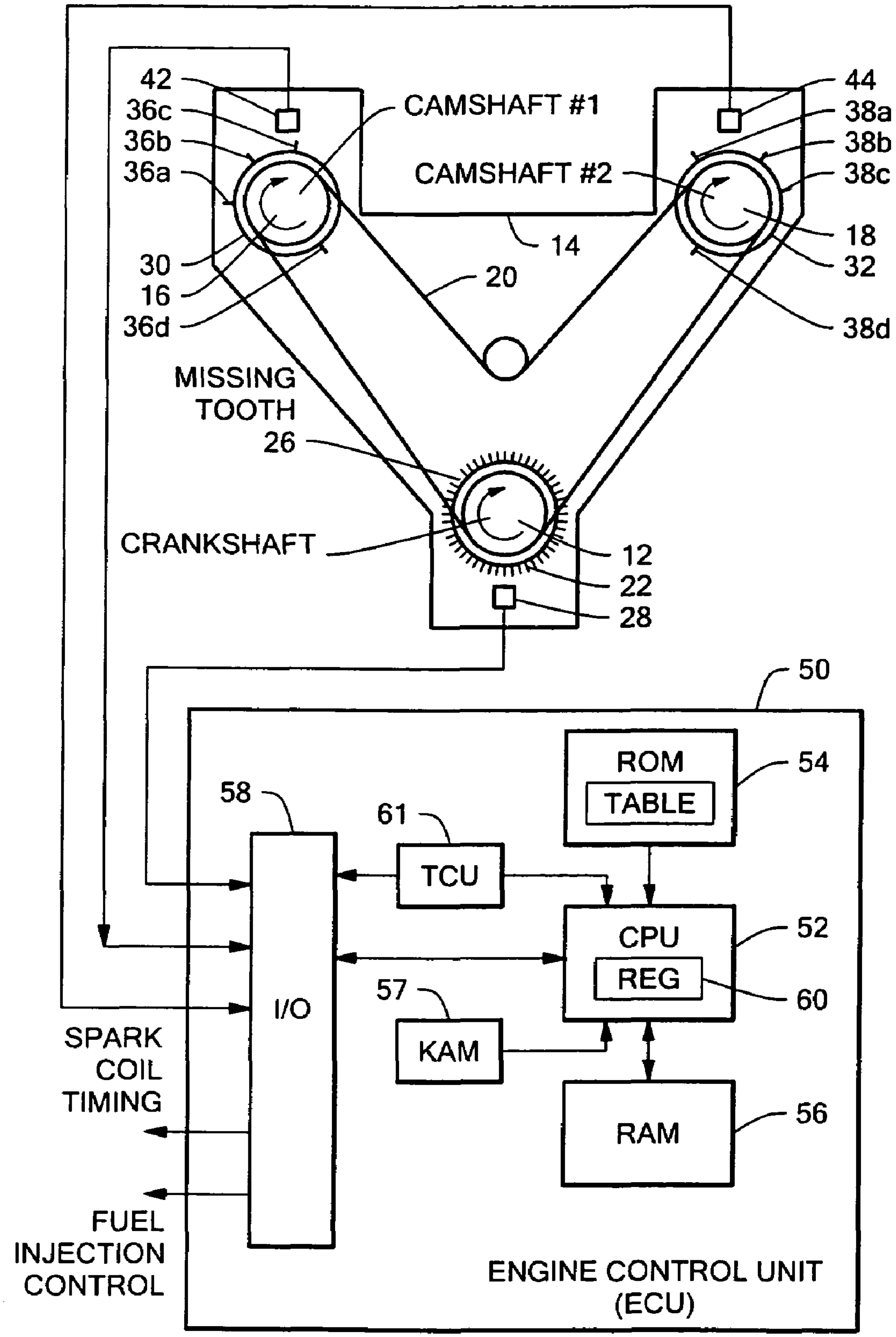
FIG. 1 is a diagram of an internal combustion engine having a control system according to the invention.

Referring now to FIG. 1 a four-stroke, internal combustion engine 10 is shown to include a crankshaft 12 rotatable within an engine block 14 of the engine 10. The engine 10 is here a V-type engine, here, in this example, a V-6 engine having a pair of camshafts 16, 18 rotatable within the engine block 14 driven by the crankshaft 12 through a timing belt 20.

The crankshaft 12 is fixed to a crankshaft wheel 22. The crankshaft wheel 22 has a plurality of crankshaft wheel marks 24, here teeth, disposed about the periphery of the wheel 22 and at least one crankshaft position indicia 26, here one indicia, the absence of a tooth, i.e., a missing tooth. Here, in this example, the marks and missing tooth 26 are regularly positioned angularly about the periphery of the wheel 22, one every ten degrees. That is, there is a series of 35 equally spaced teeth 24 followed by a space, or gap, i.e., the missing tooth 26.

It is noted that there because engine 10 is a four-stroke engine there are 720 degrees of rotation of the crankshaft 12 to complete one complete combustion cycle for the engine 10. Here, rotational angles will be measured in terms of rotational angle of the crankshaft 12. Thus, every 360 degrees of physical rotation of the one of the camshafts 16, 18 results from a 720 degree physical rotation of the crankshaft 12. Therefore, there are 720 degrees or two revolutions of the crankshaft for one camshaft rotation.

A crankshaft sensor 28 is fixed to the engine block 14 for producing a crankshaft signal in response to detection of the crankshaft position indicia, i.e., the detection of the missing tooth 26. More particularly, each time a tooth of the crankshaft passes the sensor 28 a pulse is produced. Thus, a series of pulses is produced having the time, T, between pulses except when the missing tooth 26 passes by the sensor 28 in which case the time T' between pulses with the missing tooth will be twice as long as the time T, thus, when the missing tooth passes by the sensor 28 a gap in time of 2T=T' will be produced by sensor 28 thereby providing a crankshaft signal in response to detection of the crankshaft position indicia; i.e, here the missing tooth 26.

The crankshaft 12 is positioned in the block 14 relative to the sensor 28 so that when the sensor 28 produces the crankshaft signal, the missing tooth 28 has a predetermined angular relationship with the engine block 14 (i.e., a particular cylinder, not shown, in the engine block is at Top Dead Center, TDC).

The engine 10 also includes a pair of camshaft wheels 30, 32 fixed to a corresponding one of the camshafts 16, 18, respectively, each one of the wheels 30, 32 having a predetermined pattern of camshaft wheel marks, here teeth 36, 38, respectively. More particularly, wheel 30 has teeth 36*a*, 36*b*, 26*c* and 36*d* and wheel 32 has teeth 38*a*, 38*b*, 38*c* and 38*d*. Tooth 36*b* is physically 60 degrees from both tooth 36*a* and tooth 36*c* and tooth 36*d* is physically 120 degrees from both teeth 36*a* and 36*c*.

The engine 10 includes a pair of camshaft sensors 42, 44, fixed to the engine block 14, for producing camshaft signals in response to detection of the camshaft wheel marks 36*a*, 36*b*, 36*c* and 36*d*, and 38*a*, 38*b*, 38*c* and 38*d*, respectively.

Figures 2A, 2B, 2C, 2D:
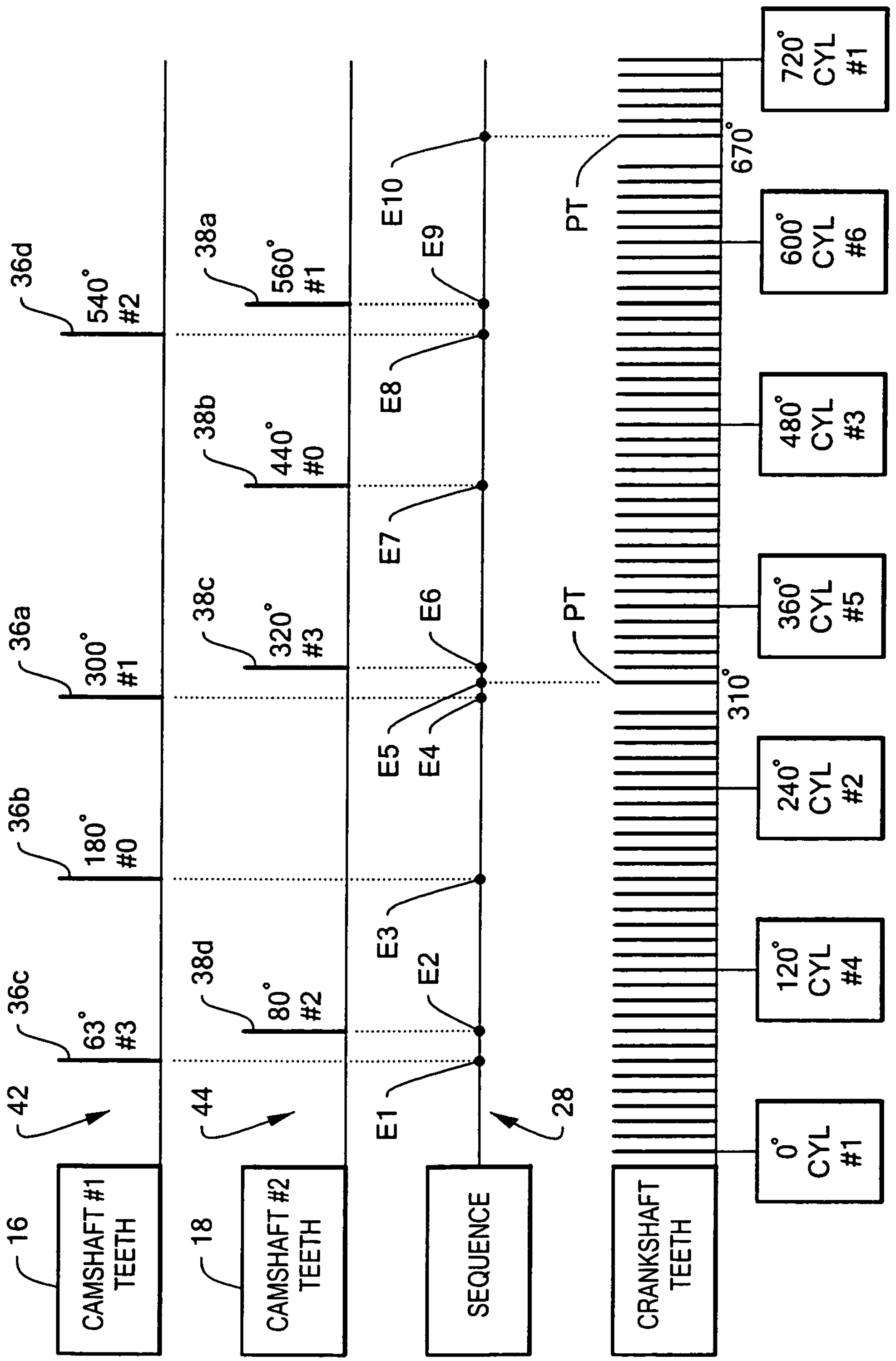
FIGS. 2A–2D are diagrams showing signals produced by camshaft and crankshaft sensors used in the system of FIG. 1, according to the invention, such signals producing a sequence, or pattern of such signals shown in FIG. 2C, such crankshaft having teeth and a missing tooth arranged as shown in FIG. 2D.

Thus, referring to FIGS. 2A through 2D, the signals produced by the camshaft sensor 42 as the crankshaft 12 rotates is shown in FIG. 2A, the signal produced by camshaft sensor 44 as the crankshaft 12 rotates is shown in FIG. 2B and the signal produced by crankshaft sensor 28 as the crankshaft 12 rotates is shown in FIG. 2D. Referring also to FIG. 1, it is noted that the first tooth 22 on the crankshaft 12 after the missing tooth 26 is designated as the principal tooth PT. Thus, the principal tooth PT is detected twice for every 720 degrees of rotation of the crankshaft 12. It is also noted that, for the condition shown in n FIGS. 2A through 2D, initially cylinder #1 is at TDC at zero degrees rotation of the crankshaft, cylinder #4 is at TDC at 120 degrees rotation of the crankshaft, cylinder #2 is at TDC at 240 degrees rotation of the crankshaft cylinder, cylinder #5 is at TDC at 360 degrees rotation of the crankshaft, cylinder #3 is at TDC at 480 degrees rotation of the crankshaft, and cylinder #6 is at TDC at 600 degrees rotation of the crankshaft.

Further, at 60 degrees of rotation of the crankshaft 12, sensor 42 detects tooth 36*c* of camshaft wheel 30, labeled as event E1 in FIG. 2C.

Next, at 80 degrees of rotation of the crankshaft 12, sensor 44 detects tooth 38*d* of camshaft wheel 32, labeled as event E2 in FIG. 2C. Next, at 180 degrees of rotation of the crankshaft 12, sensor 42 detects tooth 36*b* of camshaft wheel 30, labeled as event E3 in FIG. 2C. Next, at 300 degrees of rotation of the crankshaft 12, sensor 42 detects tooth 36*a* of camshaft wheel 30, labeled as event E4 in FIG. 2C. Next, at 310 degrees of rotation of the crankshaft 12, sensor 28 detects the principal tooth PT of the crankshaft wheel 22, labeled as event E5 in FIG. 2C. Next, at 320 degrees of rotation of the crankshaft 12, sensor 44 detects tooth 38*c* of camshaft wheel 32, labeled as event E6 in FIG. 2C. Next, at 440 degrees of rotation of the crankshaft 12, sensor 44 detects tooth 38*b* of camshaft wheel 32, labeled as event E7 in FIG. 2C. Next, at 540 degrees of rotation of the crankshaft 12, sensor 42 detects tooth 36*d* of camshaft wheel 30, labeled as event E8 in FIG. 2C. Next, at 560 degrees of rotation of the crankshaft 12, sensor 44 detects tooth 38*a* of camshaft wheel 32 labeled as event E9 in FIG. 2C. Finally, at 670 degrees of rotation of the crankshaft 12, crankshaft sensor 28 detects the principal tooth PT of the crankshaft wheel 22, labeled as event E10 in FIG. 2C.

Thus, rotation of the crankshaft 12 generates a pattern comprising the crankshaft signal, PT and the camshaft signals C1 from sensor 42 and C2 from sensor 44 shown in FIGS. 2A and 2B.

Thus, the interval between the crankshaft start angle and the end angle is the range of engine starting positions which will result in the unique pattern of signals from the camshaft and the crankshaft given in the table below where C1 indicates detection of a tooth (i.e., tooth 36*a*, 36*b*, 36*c* or 36*d*) on the camshaft 16 wheel 30 by sensor 42, C2 indicates detection of a tooth (i.e., tooth 38*a*, 38*b*, 38*c* or 38*d*) on camshaft 18 wheel 32 from sensor 44, and PT indicates detection of the principal crankshaft tooth, PT (i.e., the first tooth after missing tooth 26), the crankshaft teeth being detected by sensor 28.

Further, it is desired that the process to operate correctly. Thus, the process declares engine position after the second detection of the principal tooth. This is required in order to start the engine with failed cam sensors. Also, it is desired that a determination be made as to whether the engine position has been positively determined (using the state table to be described) or has been assumed according to the logic described above. This information is used by the spark control during startup to determine whether the spark must be fired once per engine cycle (normal spark) or twice (waste spark) in order to start the engine. Firing the waste spark is to be avoided as much as possible in order to minimize the possibility of engine backfires.

The implication of these two requirements is that the process not confuse one engine position with another due to a failed cam sensor.

The "state" in the state table below is a numerical value corresponding to each pattern calculated using an algorithm to be described in connection with FIG. 3. Suffice it to say here that each pattern has a unique numerical value or designation.

In the strategy described in this example, the crankshaft missing tooth will be detected only if at least four crankshafts are detected prior to the missing tooth.

TABLE I

| Start Angle | End Angle | Pattern ("State") | Interval Test | Angle | Cam Tooth ID |
|---|---|---|---|---|---|
| 621 | 60 | C1, C2, C1 (numerical value = 89) | none | 180 | cam wheel 30 tooth 36b |
| 61 | 80 | C2, C1, C1, PT (numerical value = 407) | none | 310 | none |
| 81 | 180 | C1, C1, PT (numerical value = 87) | none | 310 | none |
| 181 | 260 | C1, PT (numerical value = 23) | none | 310 | none |
| 261 | 320 | C2, C2, C1 (numerical value = 105) | <3 | 540 | cam wheel 30 tooth 36d |
| 321 | 440 | C2, C1, C2 (numerical value = 102) | none | 560 | cam wheel 32, tooth 38a |
| 441 | 540 | C1, C2, PT (numerical value = 91) | none | 670 | none |
| 541 | 560 | C2, PT (numerical value = 27) | <16 | 670 | none |
| 561 | 620 | PT, C1 (numerical value = 29) | 0 | 60 | cam wheel 30, tooth 36c |

It is should be noted that the only states stored in TABLE I are: 23, 27, 29, 87, 89, 91, 102, 105, and 407 and that each state corresponding to one of the patterns of C1, C2 and PT. More particularly, state 89 corresponds to pattern C1, C2, C1 (i.e., indicating a crank angle of 180 degrees), state 407 corresponds to pattern C2, C1, C1, PT (i.e., indicating a crank angle of 310 degrees), state 87 corresponds to pattern C1, C1, PT (i.e., indicating a crank angle of 310 degrees), state 23 corresponds to pattern C1, PT (i.e., indicating a crank angle of 310 degrees), state 105 corresponds to pattern C2, C2, C1 (i.e., indicating a crank angle of 540 degrees), state 102 corresponds to pattern C2, C1, C2 (i.e., indicating a crank angle of 560 degrees), state 91 corresponds to pattern C1, C2, PT (i.e., indicating a crank angle of 670 degrees), state 27 corresponds to pattern C2, PT (i.e., indicating a crank angle of 670 degrees), and state 29 corresponds to pattern PT, C1 (i.e., indicating a crank angle of 60 degrees).

It is noted that the "C1" signal must be detected no more than three teeth before the principal tooth is detected in order to assure that the engine position is 310 degrees. Without this interval test, if there is a failure of camshaft sensor 44, the process might incorrectly determine that the engine position is 310 degrees when the true position is 670 degree.

The engine 10 includes a processor, here an engine control unit (ECU) 50 for comparing the generated pattern to a stored reference pattern for determining from such comparison the position of the crankshaft 12 within the engine bock 14.

The ECU 50 includes a central processing unit (CPU) 52, a read-only memory (ROM) 54 for storing control programs, a random access memory (RAM) 56 for temporary data storage, a keep-alive memory (KAM), 57, for storing learned values, and an Input/Output (I/O) section 58 fed by signals produced by the sensors 42, 44 and 28 and for providing spark coil timing and fuel injection signals to the engine 10.

Figure 3:
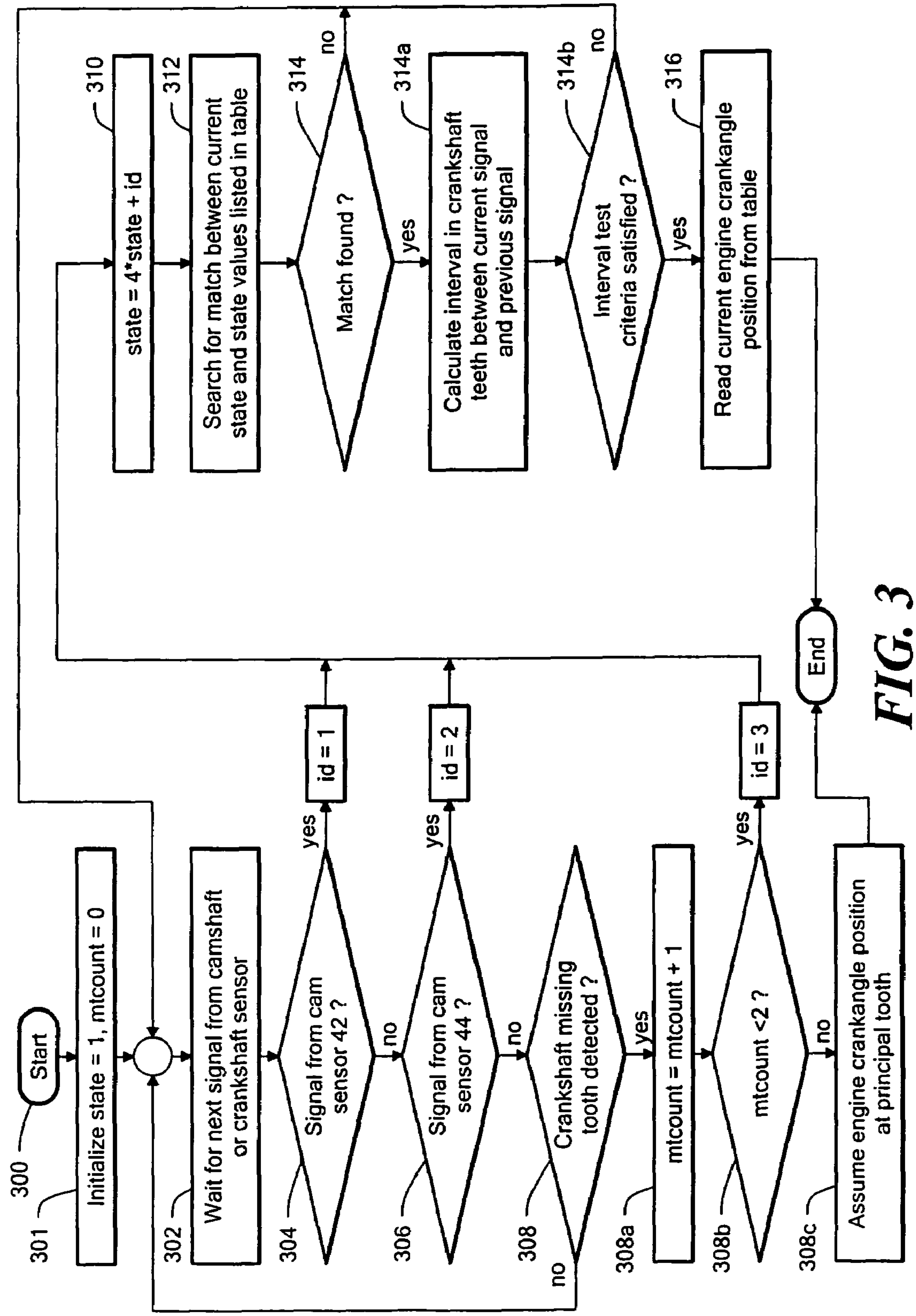
FIG. 3 is a flow diagram of a process used by the system of FIG. 1 and FIGS. 2A–2D to determine crankshaft angle according to the invention.
Figures 4A, 4B, 4C, 4D, 4E:
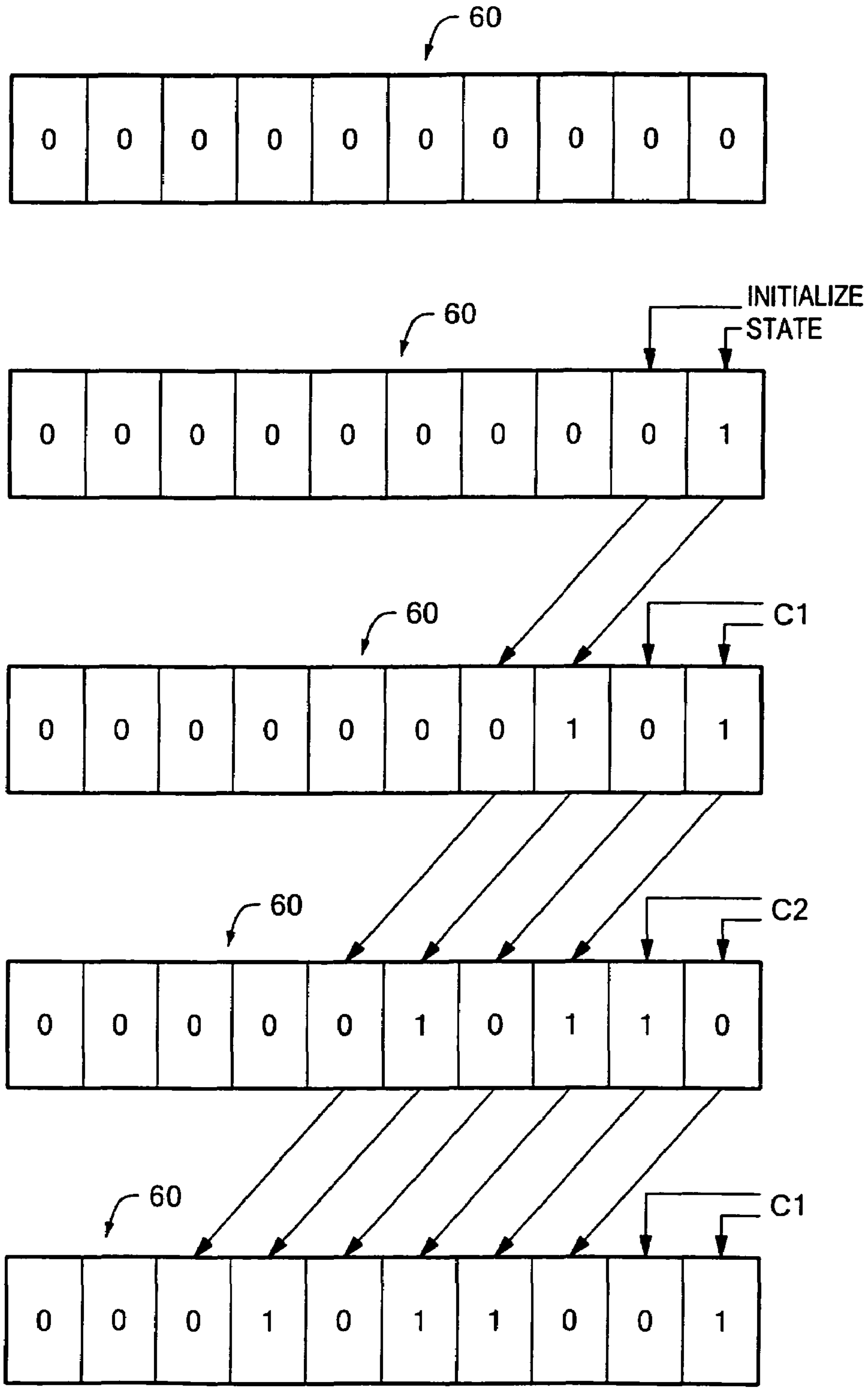
FIGS. 4A–4E show data stored in a register used in the system of FIG. 1 at various steps in the process shown in FIG. 3.

Referring now to FIG. 3, a flow chart of the process used to determine the crankshaft angle from TABLE I above is shown, such process being stored in a computer program in ROM 54. Thus, at ignition, Step 300, a register 60 in the CPU 52 (FIG. 4A) is initialized to a count of 1, and a missing tooth count (i.e., mtcount)=0, as shown in FIG. 4B, Step 301.

In Step 302 (FIG. 3), the CPU 52 waits for a signal from any one of the crankshaft sensor 28, the camshaft sensor 42 or the camshaft sensor 44. If a signal from one of theses sensors is detected, the bits in the register 60, FIG. 4B are shifted two places to the left (i.e., towards the next two most significant bits), as shown in FIG. 4C.

In Step 304, the CPU 52 determines whether the detected signal is from camshaft sensor 42, and if it is an "id"=1, base ten, (i.e., 01, base 2) is stored in the least significant bits of register 60; if not in Step 306 the CPU 52 determines whether the detected signal is from camshaft sensor 44, and if it is an "id"=2, base ten, (i.e., 10, base 2) is stored in the least significant bits of register 60; and, if not, in Step 308 the CPU 52 determines whether a crankshaft missing tooth has been detected. If not, the process returns to Step 302; if a missing tooth was detected, mt is incremented by one. i.e., mtcount=mtcount=1, Step 308*a*.

The CPU 52 then determines whether mtcount<2, Step 308*b*. If not, the process assumes the engine crank angle position is at the principal tooth, Step 308*c*; otherwise, if mtcount is <2, an "id"=3, base ten, (i.e., 11, base 2) is stored in the least significant bits of register 60 and the process proceeds to Step 310. In Step 310, the detected signal is from crankshaft sensor 28, and the state stored in register 60 is (4*state+id), in base 10.

Next, in Step 312, the CPU 52 searches Table I to determine whether there is a match between the current state and the states in Table I.

For example, considering FIGS. 2A–2D where the pattern will be C1, C2, C1, shown in the first row of the TABLE I above, here the first event after initialization is detection of a signal from camshaft sensor 42; thus, state C1 is detected and an id=1, base 10 (i.e., a 01, base 2) is stored in the least significant bits of register 60, as shown on FIG. 4C. Thus, the current state is 1, base 10. It is noted that the digital word now stored in register 60 is 5, base 10, i.e., state=4*state+id=4+1=5.

In Step 312, a search is made of the Table I above to determine whether state 5 is one of the states stored in the TABLE I above. As noted above, the only states stored in the TABLE I are: 23, 26, 27, 29, 87, 89, 91, 102, and 407. Thus, because state 5 is not stored in the TABLE I, (Step 314), the process returns to Step 302.

Continuing, the next event is detection so that the data in register 60 shifts two bits to the left, as shown in FIG. 4D.

Here the detected signal is from camshaft sensor 44; thus, state C2 is detected and an id=2, base 10 (i.e., a 10, base 2) is stored in the least significant bits of register 60, as shown on FIG. 4D. It is noted that the digital word now stored in register 60 is 22, base 10, i.e., state=4*state+id=4*5+2=22. As noted above, the only states stored in the TABLE I are: 23, 26, 27, 29, 87, 89, 91, 102, and 407. Thus, because state 22 is not stored in the TABLE I, (Step 314), the process returns to Step 302.

Continuing, the next event is detection so that the data in register 60 shifts two bits to the left, as shown in FIG. 4E. Here the detected signal is from camshaft sensor 42; thus, state C1 is detected and an id=1, base 10 (i.e., a 01, base 2) is stored in the least significant bits of register 60, as shown on FIG. 4E. It is noted that the digital word now stored in register 60 is 89, base 10, i.e., state=4*state+id=4*22+1=89. As noted above, the only states stored in the TABLE I are: 23, 26, 27, 29, 87, 89, 91, 102, and 407. Thus, because state 89 is stored in the TABLE I, (Step 314), the process proceeds to Step 314*a*, In Step 314*a*, the CPU 52 calculates the interval in crankshaft teeth between the current signal (i.e., tooth count) and the prior signal (i.e., tooth count). The CPU 52 then determines whether the interval test shown in the Table I above is satisfied, Step 314*b*. If it is satisfied, then the CPU 52 reads the engine crank angle position from Table I, Step 316; otherwise, the process returns to Step 302.

Here such angle is 180 degrees from the angle cylinder #1 was at TDC. The CPU 52 then uses this information to determine spark coil timing and fuel injection in accordance with any known strategy.

Considering a second example in FIGS. 2A–2D, where the pattern will be C2, C1, C1, PT, shown in the second row of the able above, here the first event after initialization is state C2 and an id=2 is produced. Thus, the prior state was 1. Thus, the digital word now stored in register 60 is 6, i.e., state=4*state+id=4+2=6.

In Step 312, a search is made of the TABLE I above to determine whether state 6 is one of the states stored in the TABLE I above. As noted above, the only states stored in the TABLE I are: 23, 26, 27, 29, 87, 89, 91, and 102. Thus, because state 6 is not stored in the TABLE I, (Step 314), the process returns to Step 302.

The next event is state C1 and an id=1 is produced. The prior state was 6. Thus, the digital word now stored in register 60 is 25, i.e., state=4*state+id=4*6+1=25.

In Step 312, a search is made of the TABLE I above to determine whether state 25 is one of the states stored in the TABLE above. As noted above, the only states stored in the TABLE are: 23, 26, 27, 29, 87, 89, 91, 102, and 407. Thus, because state 25 is not stored in the TABLE I, (Step 314), the process returns to Step 302.

The next event is state C1 and an id=1 is produced. The prior state was 25. Thus, the digital word now stored in register 60 is 101, i.e., state=4*state+id=4*25+1=101.

In Step 312, a search is made of the TABLE I above to determine whether state 101 is one of the states stored in the TABLE I above. As noted above, the only states stored in the TABLE I are: 23, 26, 27, 29, 87, 89, 91, 102, and 407. Thus, because state 101 is not stored in the TABLE I, (Step 314), the process returns to Step 302.

The next event is state PT (i.e., a missing tooth) and Step 308 produces an id=3. The prior state was 101. Thus, the digital word now stored in register 60 is 101, i.e., state=4*state+id=4*101+3=407.

In Step 312, a search is made of the TABLE I above to determine whether state 407 is one of the states stored in the TABLE I above. As noted above, the only states stored in the TABLE I are: 23, 26, 27, 29, 87, 89, 91, 102, and 407. Thus, because state 407 is stored in the TABLE I, (Step 314), the process reads the engine crank angle from the TABLE I, Step 316, here such angle being 310 degrees from the angle cylinder #1 was at TDC.

Thus, it follows that identification of one of the states stored in the TABLE I in Step 316, i.e., states 23, 26, 27, 29, 87, 89, 91, 102, and 407 enables the process to read the crank angles 180 degrees, 310, degrees, 310, degrees, 310 degrees, 540 degrees, 560 degrees, 670 degrees, 670 degrees, and 60 degrees, respectively, as indicated in the table above.

Figures 5A, 5B, 5C, 5D:
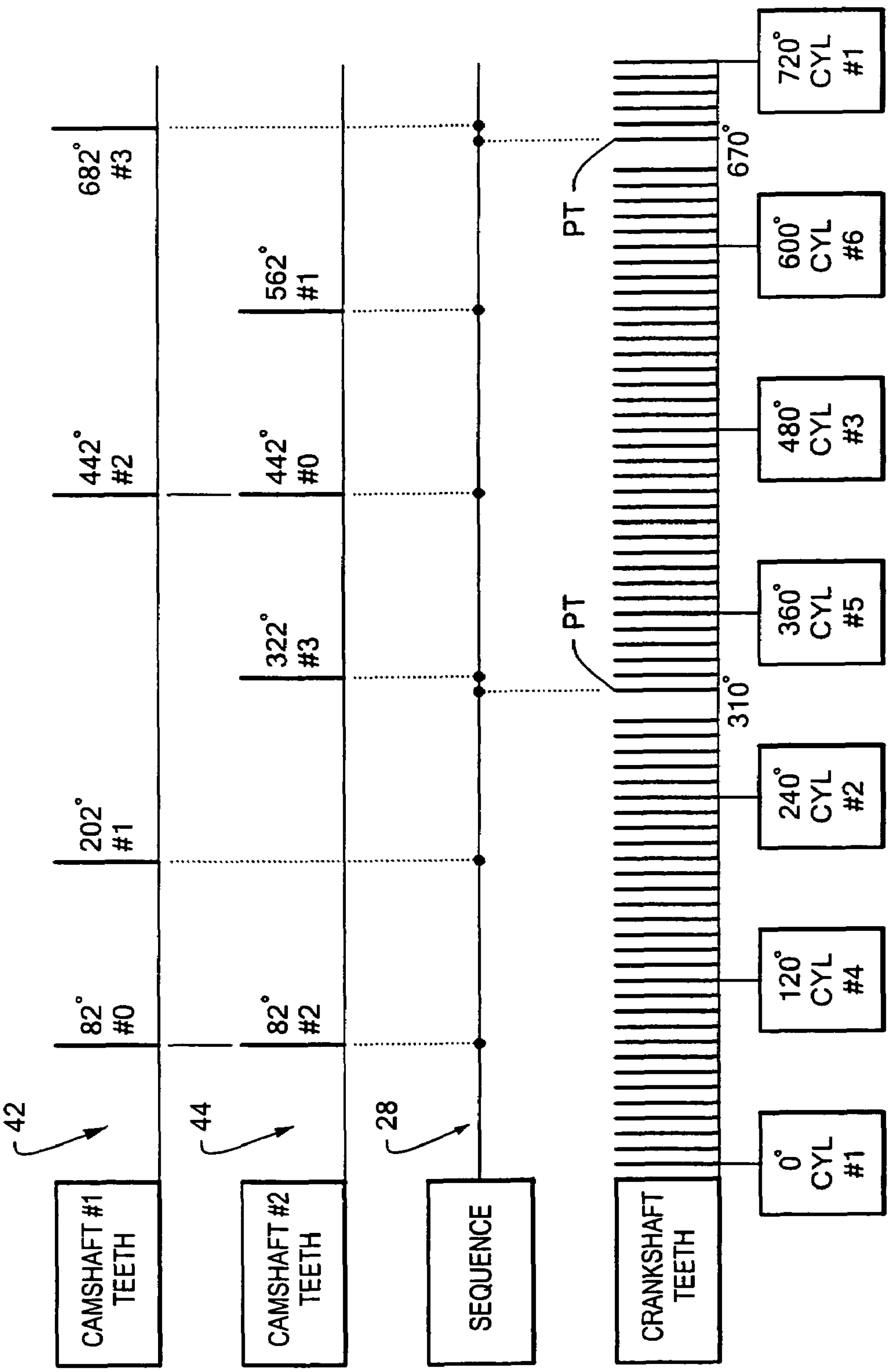
FIGS. 5A–5D are diagrams showing signals produced by camshaft and crankshaft sensors used in the system of FIG. 1, according to another embodiment of the invention, such signals producing a sequence, or pattern of such signals shown in FIG. 5C, such crankshaft having teeth and a missing tooth arranged as shown in FIG. 5D.

Referring now to FIGS. 5A–5D, a second embodiment is shown. Here, each one of the camshaft wheels again three teeth, here labeled and referred to as teeth #1, #2, #3, and #4 in FIGS. 5A and 5B where the signals produced by the camshaft sensor 42 as the crankshaft 12 rotates is shown in FIG. 5A, the signal produced by camshaft sensor 44 as the crankshaft 12 rotates is shown in FIG. 5B and the signal produced by crankshaft sensor 28 as the crankshaft 12 rotates is shown in FIG. 5D.

Thus, considering the wheel 30 on camshaft 16 (FIG. 1), here tooth #0 (i.e., tooth 36*b*), and tooth #1 (tooth 36*c*) are separated in mechanical angle by 60 degrees; tooth #1 (i.e. tooth 36*c*) and tooth #2 (i.e., tooth 36*d*) are separated in mechanical angle by 120 degrees, and tooth #2 (i.e., tooth 36*d*) and tooth #3 (i.e., tooth 36*a*) are separated in mechanical angle by 120 degrees.

Considering the wheel 32 on camshaft 18 (FIG. 1), here tooth #0 (i.e., tooth 38*b*), and tooth #1 (tooth 38*a*) are separated in mechanical angle by 60 degrees; tooth #1 (i.e. tooth 38*a*) and tooth #2 (i.e., tooth 38*d*) are separated in mechanical angle by 120 degrees, and tooth #2 (i.e., tooth 38*d*) and tooth #3 (i.e., tooth 38*c*) are separated in mechanical angle by 120 degrees.

As noted in FIG. 1, the first tooth 22 on the crankshaft 12 after the missing tooth 26 is designated as the principal tooth PT. Thus, the principal tooth PT is detected twice for every 720 degrees of rotation of the crankshaft 12. It is also noted that, for the condition shown in n FIGS. 5A through 5D, initially cylinder #1 is at TDC at zero degrees rotation of the crankshaft, cylinder #4 is at TDC at 120 degrees rotation of the crankshaft, cylinder #2 is at TDC at 240 degrees rotation of the crankshaft cylinder, cylinder #5 is at TDC at 360 degrees rotation of the crankshaft, cylinder #3 is at TDC at 480 degrees rotation of the crankshaft, and cylinder #6 is at TDC at 600 degrees rotation of the crankshaft.

In order to keep the size of the table to a minimum (especially for V8 and V10 engines), a unique identifier is used when the signals from both cam sensors 42, 44 occur at the same time, as at event E1, in FIG. 5C. Sensor 42 detects tooth #0 of wheel 30 at substantially the same time (i.e., concurrently) sensor 44 detects tooth #2 of wheel 32; sensor 42 detects tooth #2 of wheel 30 at the same time sensor 44 detects tooth #0 of wheel 32.

More particularly, at 82 degrees of rotation of the crankshaft 12, sensors 42 and 44 both detect a tooth, detector 42 detects tooth #0 on the wheel attached thereto while sensor 44 detects tooth #2 on the wheel attached thereto.

Next, at 202 degrees of rotation of the crankshaft 12, sensor 42 detects tooth #1 of camshaft wheel 30, labeled as event E2 in FIG. 5C.

Next, at 310 degrees of rotation of the crankshaft 12, sensor 28 detects the principal tooth PT of the crankshaft wheel 22, labeled as event E3 in FIG. 5C.

Next, at 322 degrees of rotation of the crankshaft 12, sensor 44 detects tooth #3 of camshaft wheel 32, labeled as event E4 in FIG. 5C.

Next, at 442 degrees of rotation of the crankshaft 12, sensors 42 and 44 both detect a tooth, detector 42 detects tooth #2 on the wheel attached thereto while sensor 44 detects tooth #0 on the wheel attached thereto.

Next, at 562 degrees of rotation of the crankshaft 12, sensor 44 detects tooth #1 of camshaft wheel 32, labeled as event E6 in FIG. 5C.

Next, at 670 degrees of rotation of the crankshaft 12, sensor 28 detects the principal tooth PT of the crankshaft wheel 22, labeled as event E7 in FIG. 2C.

Finally, at 682 degrees of rotation of the crankshaft 12, sensor 42 detects tooth #3 of camshaft wheel 30, labeled as event E8 in FIG. 5C.

Thus, whereas with the arrangement described above in connection with FIGS. 2A–2D there were ten possible events, here there are only eight possible events. Here, however, a unique identifier, i.e., the number of crank angle teeth detected between the last two cam wheel detected teeth is also used to determine current crank angle position.

More particularly, in the strategy described in this example, the crankshaft missing tooth will be detected only if at least four crankshaft teeth are detected prior to the missing tooth. It should be noted that because the camshaft teeth from both wheels occur at approximately the same time, the state TABLE II below is longer than the TABLE I used above in connection with FIGS. 2A–2D to account for all possible patterns.

The interval between the start angle and the end angle is the range of engine starting positions which will result in the unique pattern of signals from the camshaft and the crankshaft given in the table (C1=camshaft sensor 42 for camshaft 16, C2=camshaft sensor 44 for camshaft 18, C1+C2 camshaft sensors 42 and 44 concurrent, PT=principal crankshaft tooth. PT i.e., the first tooth after missing tooth). The state is a numerical value corresponding to each pattern calculated using the algorithm to be described in FIG. 6. In this strategy, the crankshaft missing tooth will be detected only if at least four crankshafts are detected prior to the missing tooth.

It should be understood that the processor can only process one sensor signal at a time. Therefore, the for concurrent signals C1 and C2, signal C1 may be processed before signal C2 or signal C2 may be processed before signal C1.

TABLE II

| Start Angle | End Angle | Pattern (State) | Interval Test | Angle | Cam Tooth ID |
|---|---|---|---|---|---|
| 683 | 82 | C1 + C2, C1 (17) | none | 202 | cam #1, tooth #1 |
| 83 | 202 | C1, PT (23) | <16 | 310 | none |
| 83 | 202 | C1, C1, PT (87) | none | 310 | none |
| 83 | 202 | C2, C1, PT (103) | none | 310 | none |
| 203 | 260 | PT, C2 (30) | <6 | 322 | cam #2, tooth #3 |
| 261 | 322 | C2, C1 + C2 (24) | none | 442 | cam #2, tooth #0<br>cam #1, tooth #2 |
| 323 | 442 | C1 + C2, C2 (18) | none | 562 | cam #2, tooth #1 |
| 443 | 562 | C2, PT (27) | <16 | 670 | none |
| 443 | 562 | C1, C2, PT (91) | none | 670 | none |
| 443 | 562 | C2, C2, PT (107) | none | 670 | none |

TABLE II-continued

| Start Angle | End Angle | Pattern (State) | Interval Test | Angle | Cam Tooth ID |
|---|---|---|---|---|---|
| 563 | 620 | PT, C1 (29) | <6 | 682 | cam #1, tooth #3 |
| 621 | 682 | C1, C1 + C2 (20) | none | 82 | cam #2, tooth #2<br>cam #1, tooth 0 |

Figure 6:
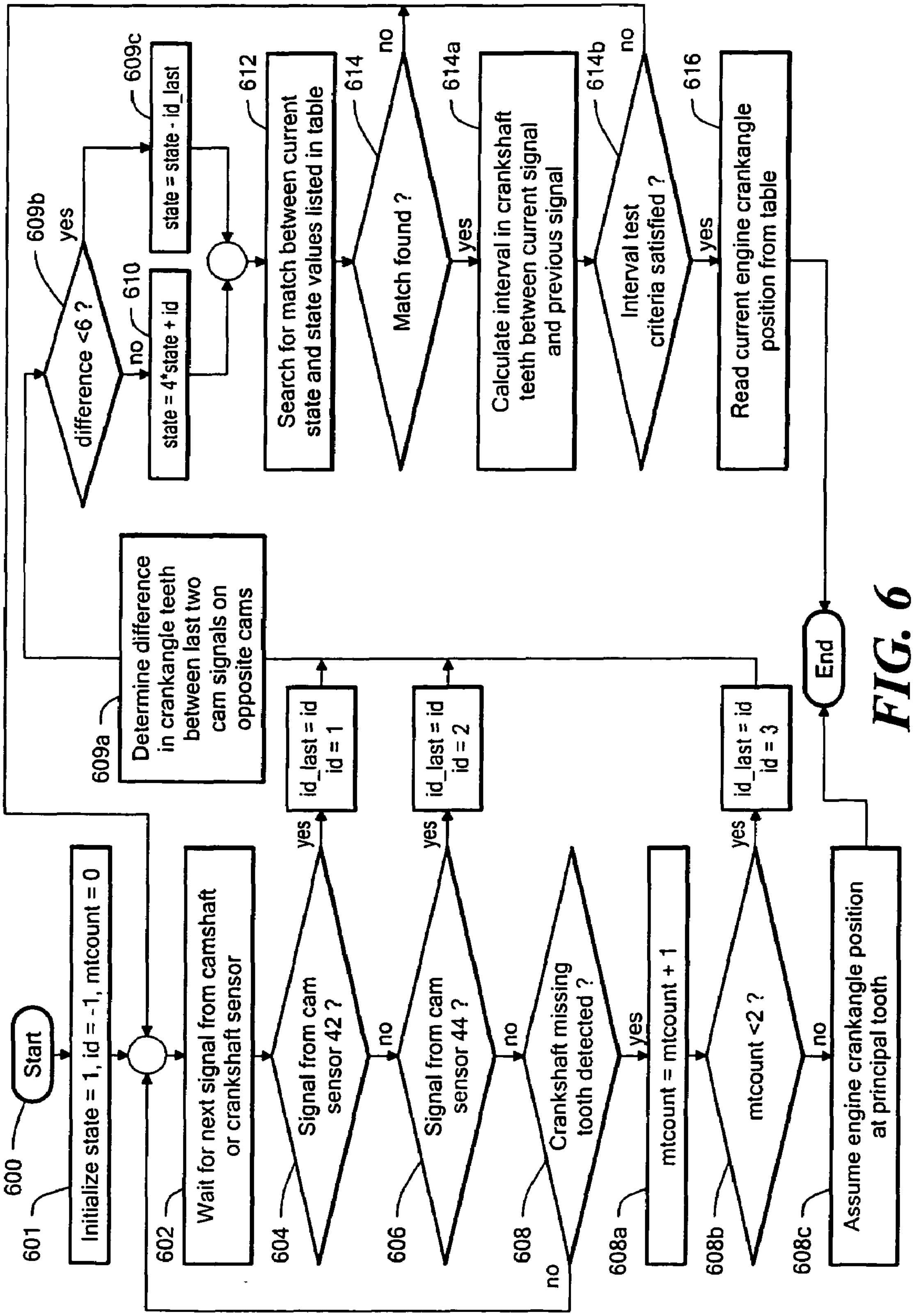
FIG. 6 is a flow diagram of a process used by the system of FIG. 1 and FIGS. 5A–5D to determine crankshaft angle according to the invention.
Figures 7A, 7B, 7C, 7D:
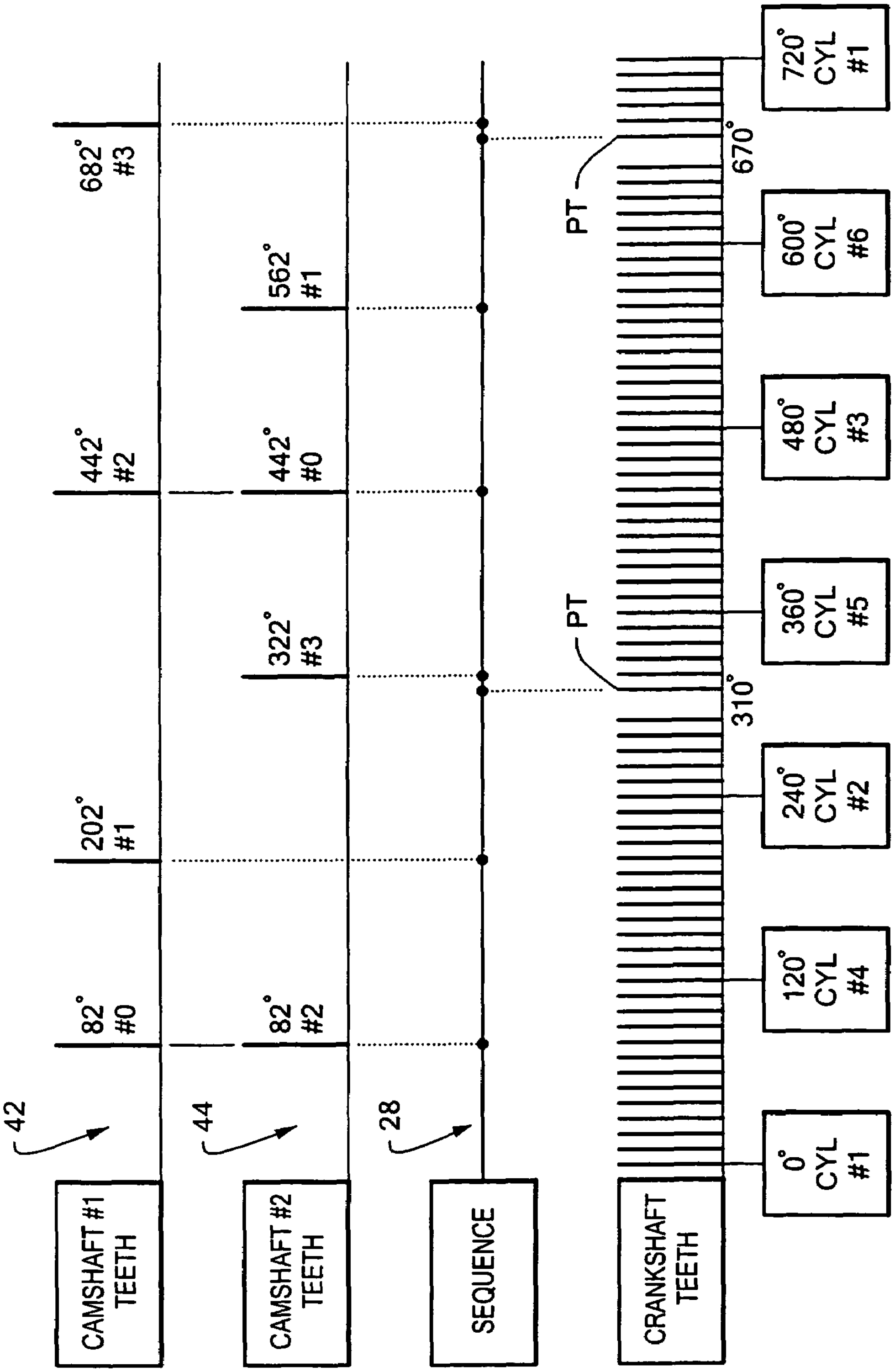
FIGS. 7A–7D are diagrams showing signals produced by camshaft and crankshaft sensors used in the system of FIG. 1, according to another embodiment of the invention, such signals producing a sequence, or pattern of such signals shown in FIG. 7C, such crankshaft having teeth and a missing tooth arranged as shown in FIG. 7D.

Referring now to FIG. 6, a flow chart of the process used to determine the crankshaft angle from the table above is shown, such process being stored in a computer program in ROM 54. As noted above, that at times both sensors 42, 44 produce concurrent signals, the processor with process one before the other; but, in any event, the two processor signals will be produced within less than the rotation of 6 crankshaft teeth. Thus, when there is a concurrent event, the processor may process the signal C1 before C2 or the signal C2 before C1, but in any event, both C1 and C2 will occur within the time the crankshaft will rotate through six crankshaft teeth positions.

Thus, at ignition, Step 600, the register 60 in the CPU 52 is initialized to a count of 1, id=−1, and mtcount=0, Step 601.

In Step 602, the CPU 52 waits for a signal from any one of the crankshaft sensor 28, the camshaft sensor 42 or the camshaft sensor 44.

In Step 604, the CPU 52 determines whether the detected signal is from camshaft sensor 42, and if it is the processor sets iid_last=id; id=1; if not in Step 606 the CPU 50 determines whether the detected signal is from camshaft sensor 44, and if it is the processor sets id_last=id; id=2; and, if not, in Step 608 the CPU 52 determines whether the crankshaft has a missing tooth, Step 608. If not, the process returns to Step 602. If a missing tooth is detected in Step 608, mtcount is incremented by one, i.e., mtcount=mtcount+1, Step 608*a*. Next, the CPU 52 determines whether mtcount>2. If not, the process proceeds to Step 608*c* and it is assumed that the engine crank angle position is at the principal tooth; if in Step 608*b* it is determined that mtcount<2, the detected signal is from crankshaft sensor 28, and the processor sets id_last=id; id=3 and proceeds to Step 609*a*.

Next, in Step 609*a*, the processor determines whether the difference in crank angle teeth between the last two camshaft teeth detections is less than 6. If not, the proceeds to Step 614 and state−4*state+id; if it is, the process Step 609*c* and state=state−id_last.

In either case, the process passes to Step 612. In Step 612, a search is made of the table above to determine whether the state is one of the states stored in the table above. The only states stored in the table are: 17, 18, 20, 23, 24, 27, 29, 30, 87, 91, 103, and 107.

If a match is found, Step 614, the current crankshaft angle is read from the TABLE II by the processor; if a match is not found, the process returns to Step 602. Otherwise, the process proceeds to Step 614*a*.

In Step 614*a*, the CPU 52 calculates the interval in crankshaft teeth between the current signal (i.e., tooth count) and the prior signal (i.e., tooth count). The CPU 52 then determines whether the interval test shown in the Table Ii above is satisfied, Step 614*b*. If it is satisfied, then the CPU 52 reads the engine crank angle position from Table II, Step 616; otherwise, the process returns to Step 602.

Figure 8:
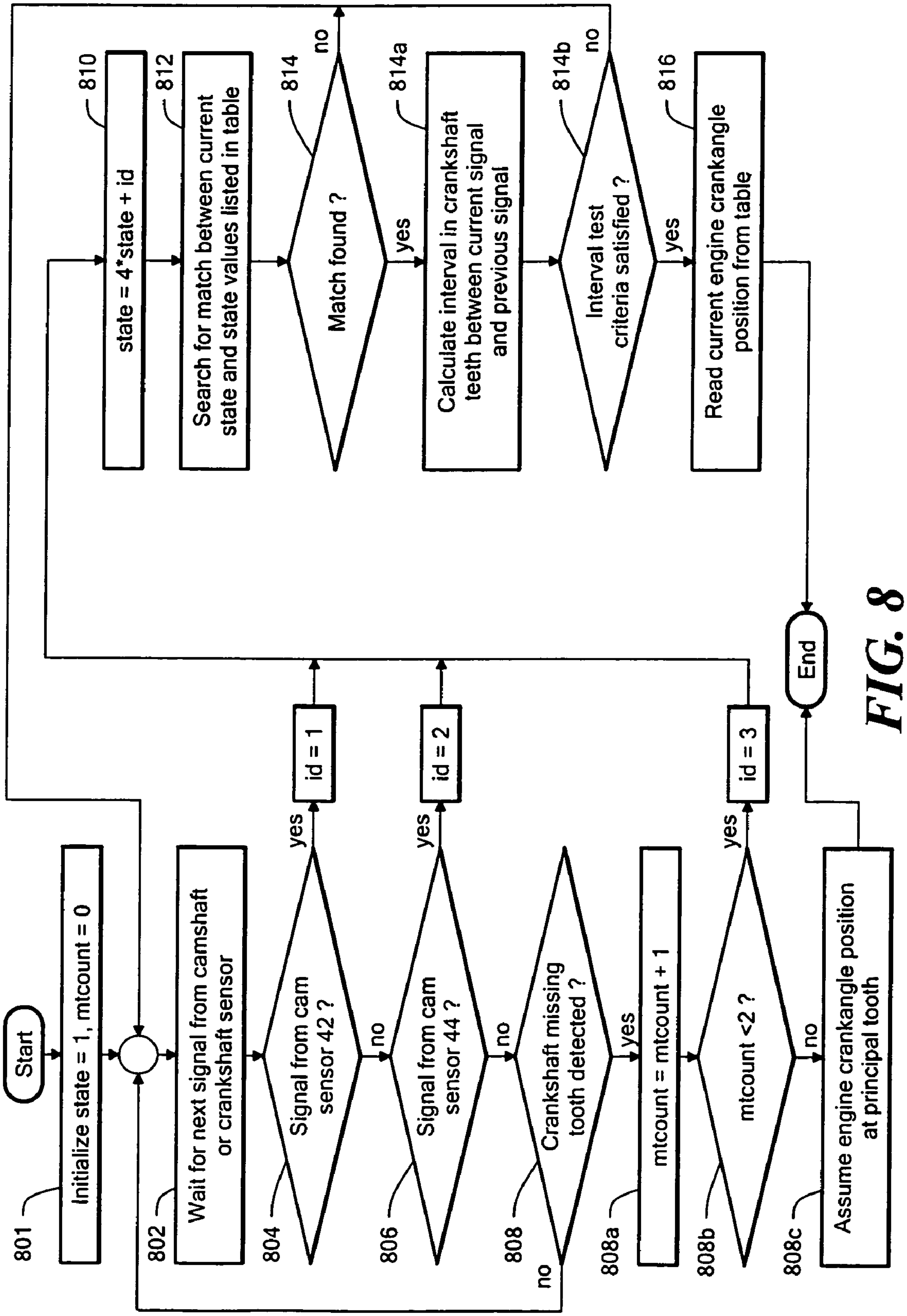
FIG. 8 is a flow diagram of a process used by the system of FIG. 1 and FIGS. 7A–7D to determine crankshaft angle according to the invention.

Referring now to FIGS. 7A–7D, the same timing diagram as described above in connection with FIGS. 5A–5D is shown. Here, however, the same processing steps described above in connection with FIG. 3 are used to determine state id. More particularly, the process used with the timing diagram of FIGS. 7A–7D is shown in FIG. 8. Thus, at ignition, Step 800, a register 60 in the CPU 52 (FIG. 4A) is initialized to a count of 1, as shown in FIG. 4B, Step 801.

In Step 802, the CPU 52 waits for a signal from any one of the crankshaft sensor 28, the camshaft sensor 42 or the camshaft sensor 44. If a signal from one of theses sensors is detected, the bits in the register 60, FIG. 4B are shifted two places to the left (i.e., towards the next two most significant bits), as shown in FIG. 4C.

In Step 804, the CPU 50 determines whether the detected signal is from camshaft sensor 42, and if it is an "id"=1, base ten, (i.e., 01, base 2) is stored in the least significant bits of register 60; if not in Step 806 the CPU 52 determines whether the detected signal is from camshaft sensor 44, and if it is an "id"=2, base ten, (i.e., 10, base 2) is stored in the least significant bits of register 60; and, if not, in Step 808 the CPU 52 determines whether the detected signal is from crankshaft sensor 28, and if not, the process returns to Step 802, if there is a missing tooth, an "id"=3, base ten, (i.e., 11, base 2) is stored in the least significant bits of register 60. Thus, as shown in Step 310, the state stored in register 60 is (4*state+id), in base 10.

With the algorithm in Steps 804, 806 and 808, the following TABLE III results:

TABLE III

| Start Angle | End Angle | Pattern (State) | Interval Test | Angle | Cam Tooth ID |
|---|---|---|---|---|---|
| 683 | 82 | C1, C2, C1 (89) | >6 | 202 | cam #1, tooth #1 |
| 683 | 82 | C2, C1, C1 (101) | none | 202 | cam #1, tooth #1 |
| 83 | 202 | C1, PT (23) | <16 | 310 | none |
| 83 | 202 | C1, C1, PT (87) | none | 310 | none |
| 83 | 202 | C2, C1, PT (103) | none | 310 | none |
| 203 | 260 | PT, C2 (30) | <6 | 322 | cam #2, tooth #3 |
| 261 | 322 | C2, C1, C2 (102) | <6 | 442 | cam #2, tooth #0 |
| 261 | 322 | C2, C2, C1 (105) | none | 442 | cam #1, tooth #2 |
| 323 | 442 | C1, C2, C2 (90) | none | 562 | cam #2, tooth #1 |
| 323 | 442 | C2, C1, C2 (102) | >6 | 562 | cam #2, tooth #1 |
| 443 | 562 | C2, PT (27) | <16 | 670 | none |
| 443 | 562 | C1, C2, PT (91) | none | 670 | none |
| 443 | 562 | C2, C2, PT (107) | none | 670 | none |
| 563 | 620 | PT, C1 (29) | <6 | 682 | cam #1, tooth #3 |
| 621 | 682 | C1, C1, C2 (86) | none | 82 | cam #2, tooth #2 |
| 621 | 682 | C1, C2, C1 (89) | <6 | 82 | cam #1, tooth 0 |

It should first be noted that the interval between the start angle and the end angle is the range of engine starting positions which will result in the unique pattern of signals from the camshaft and the crankshaft given in the table (C1=camshaft #1, C2=camshaft #2, PT=principal crankshaft tooth (first tooth after missing tooth)). Also the state is a numerical value corresponding to each pattern calculated using the algorithm shown in FIG. 8.[1] In this strategy, the crankshaft missing tooth will be detected only if at least four crankshafts are detected prior to the missing tooth.

It should next be noted that the pattern C1, C2, C1 (i.e., state 89) appears twice and that the pattern C2, C1, C2 (state 102) appears twice. The first time the pattern C1, C2, C1 (state 89) is when, reading the FIGS. 7A–7D from left to right, when there are greater than 6 crankshaft teeth between the last two signals in pattern C1, C2, C1 (i.e., there are more than 6 crankshaft teeth between the C2 to C1 portion of the pattern) indicating a crank angle of 202 degrees and the second time the pattern C1, C2, C1 appears is when there are less than 6 crankshaft teeth between the last two signals in pattern C1, C2, C1 (i.e., there are less than 6 crankshaft teeth between the C2 to C1 portion of the pattern) indicating a crank angle of 82 degrees. Further, the first time the pattern C2, C1, C2 (state 102) is when, reading the FIGS. 7A–7D from left to right, when there are less than 6 crankshaft teeth between the last two signals in pattern C2, C1, C2 (i.e., there are less than 6 crankshaft teeth between the C1 to C2 portion of the pattern) indicating a crank angle of 422 degrees and the second time the pattern C2, C1, C2 appears is when there are greater than 6 crankshaft teeth between the last two signals in pattern C2, C1, C2 (i.e., there are greater than 6 crankshaft teeth between the C1 to C2 portion of the pattern) indicating a crank angle of 562 degrees. Thus, the two patterns having the same C1, C2, C1 sequence can be differentiated one from the other by determining whether there have been more than or less than 6 crankshaft teeth detected between the last two signals in the pattern. Likewise, the two patterns having the same C2, C1, C2 sequence can be differentiated one from the other by determining whether there have been more than or less than 6 crankshaft teeth detected between the last two signals in the pattern.

Thus, referring to FIG. 8, Steps 802, 804, 806, 818, 810, 812, and 814 correspond to Steps 302, 304, 306, 318, 310, 312, and 314, respectively on FIG. 3. Here, however, the process requires additional Steps 814*a* and 814*b*, Thus, when a match is detected in Step 814, a test is performed to calculate the interval in crankshaft teeth between the current sensor 42, 44 signals (i.e., C1 or C2) and the previous sensor 42, 44 signals (i.e., C1 or C2). If the test fails, the process returns to Step 802; if the test is satisfied, the process proceed to Step 816 and the current crank angle is read from TABLE III.

Figures 9A, 9B, 9C:
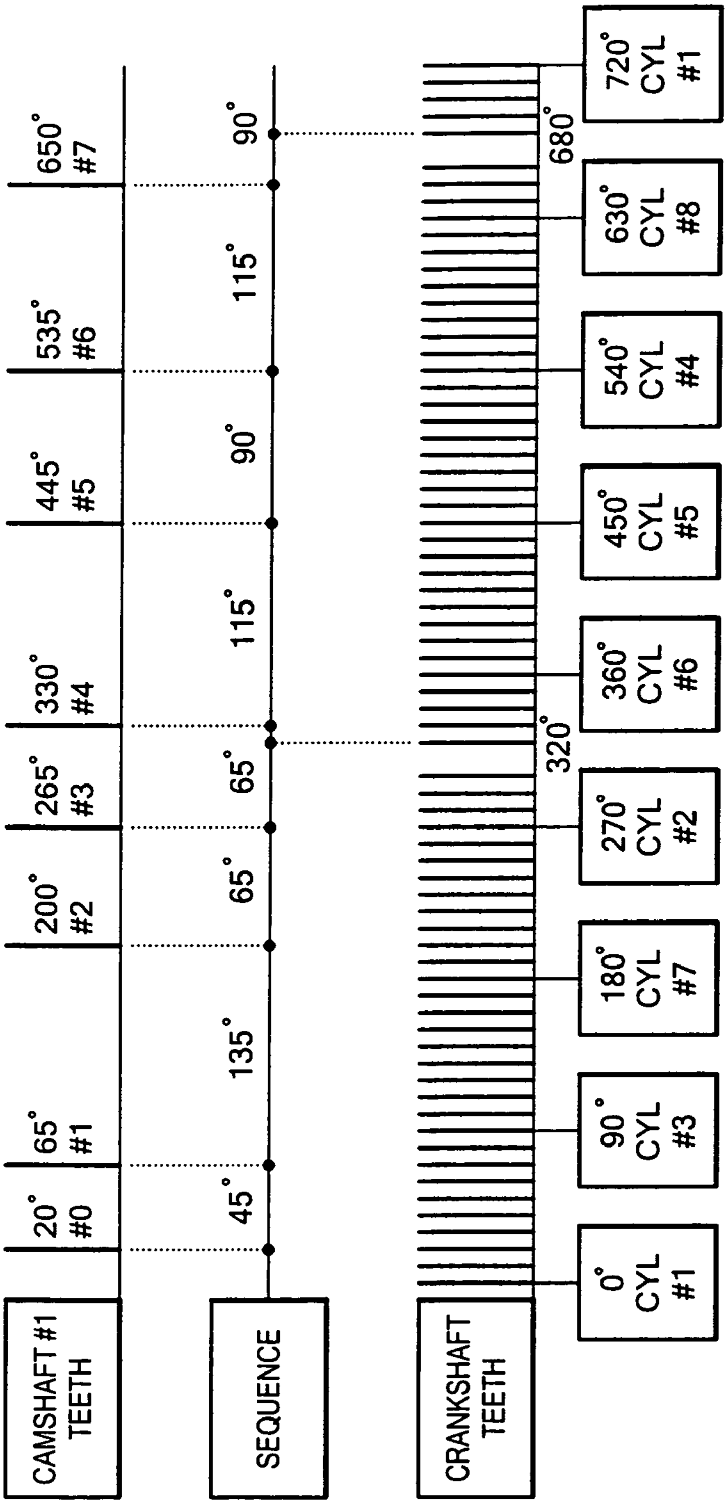
FIGS. 9A–9C are diagrams showing signals produced by camshaft and crankshaft sensors used in the system of FIG. 1, according to another embodiment of the invention, such signals producing a sequence, or pattern of such signals shown in FIG. 9B, such crankshaft having teeth and a missing tooth arranged as shown in FIG. 9C.
Figure 10:
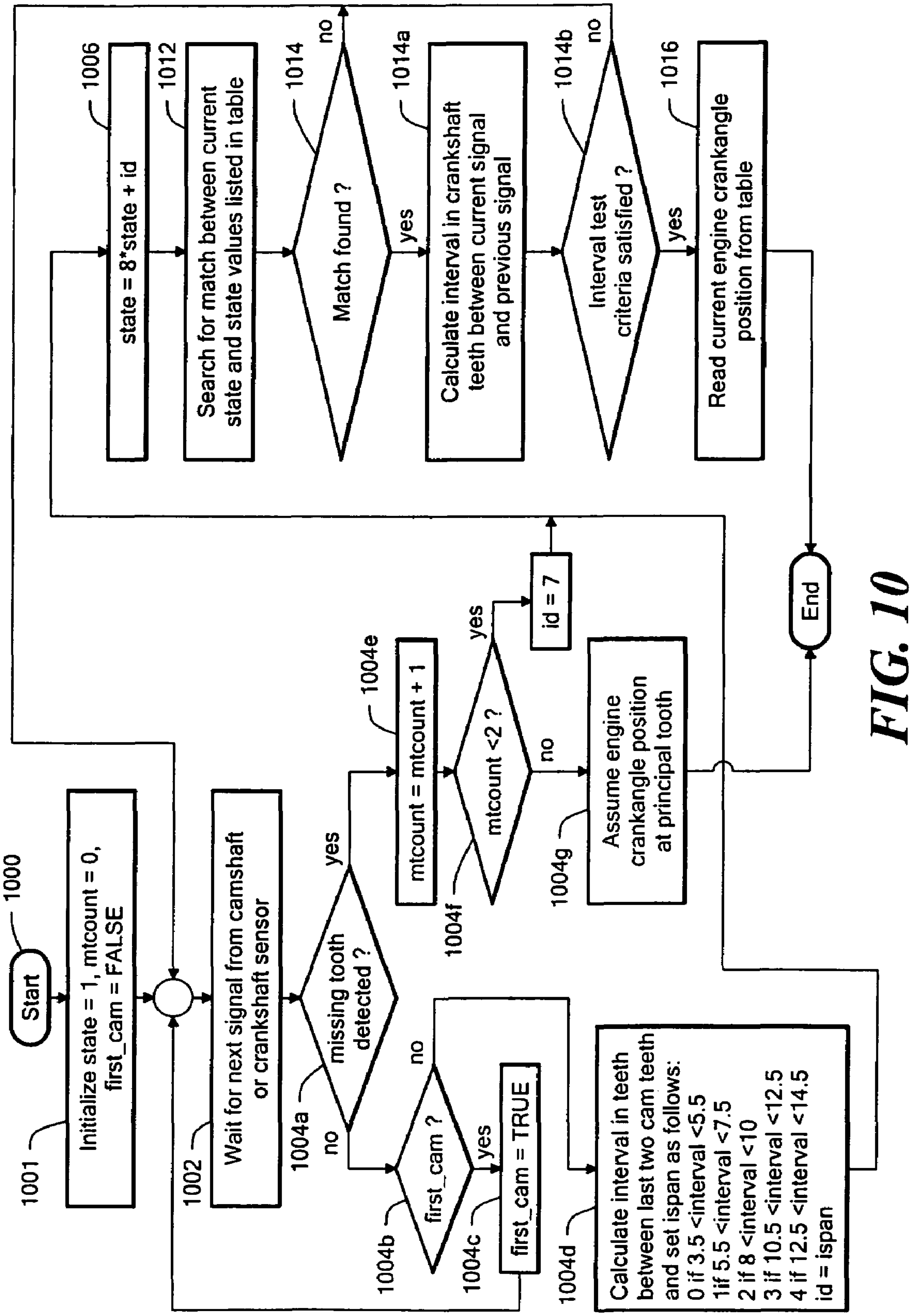
FIG. 10 is a flow diagram of a process used by the system of FIG. 1 and FIGS. 9A–9C to determine crankshaft angle according to the invention.

Referring now to FIGS. 9A–9C, a timing diagram is shown for a V-8 engine having one cam and hence only one of the two camshaft sensors 42,44, here say the signal C1 produced by sensor 42. Here, the process generates a pattern comprising: (1) sequences of the number of crankshaft teeth between sequential pairs of camshaft signals, C1; and crankshaft signals, PT. For calculating the state variable from the generated pattern, the sequences are numbered 0 through 4 for the crankshaft teeth intervals from smallest to the largest. Also, the variable "first_cam", to be described in connection with the process flow diagram in FIG. 10, is used delay the interval calculation until the strategy receives at least two cam teeth detections. Also, notice that state is multiplied by the number eight each time a new interval or principal tooth is detected. This is due to the fact that the strategy needs three bits to identify the intervals.

For the diagram shown in FIGS. 9A–9C, and with the algorithm used in the process shown in FIG. 10, the following TABLE IV results:

TABLE IV

| Start Angle | End Angle | Pattern (State) | Interval Test | Angle | Cam Tooth ID |
|---|---|---|---|---|---|
| 651 | 20 | 45 (8) | none | 65 | tooth #1 |
| 21 | 65 | 135 (12) | none | 200 | tooth #2 |
| 66 | 80 | 65 (9) | >14 | 265 | tooth #3 |
| 81 | 200 | 65, PT (79) | none | 320 | none |
| 81 | 200 | 65, 65, PT (591) | none | 320 | none |
| 201 | 265 | PT, 65 (121) | none | 330 | tooth #4 |
| 266 | 270 | PT, 115 (123) | none | 445 | tooth #5 |
| 271 | 330 | 115, 90 (90) | none | 535 | tooth #6 |
| 331 | 445 | 90 (10) | none | 535 | tooth #6 |
| 446 | 535 | 115, PT (95) | none | 680 | none |
| 536 | 650 | PT, 90 (122) | none | 20 | tooth #0 |

The interval between the start angle and the end angle is the range of engine starting positions which will result in the unique pattern of signals from the camshaft and the crankshaft given in the table (interval in degrees, PT=principal crankshaft tooth (first tooth after missing tooth)). The state is a numerical value corresponding to each pattern calculated using the algorithm shown in FIG. 10. Variation in the position of the camshaft relative to the crankshaft may cause tooth #4 to occur before the principal tooth at 320°. In the current strategy, the crankshaft missing tooth will be detected only if at least four crankshafts are detected prior to the missing tooth Thus referring to the FIGS. 9A–9C, there are the following patterns:

(A) an interval of 45 degrees between a sequential pair of cam signals C1, (state 8);

(B) an interval of 135 degrees between a sequential pair of cam signals C1, (state 12);

(C) an interval of 65 degrees between a sequential pair of cam signals C1, (state 9);

(D) an interval of 65 degrees between a sequential pair of cam signals C1 followed by a missing tooth, PT, (state 79);

(E) an interval of 65 degrees between a sequential pair of cam signals C1 followed by another interval of 65 degrees between a sequential pair of cam signals C1, followed by a missing tooth, PT, (state 591);

(F) a missing tooth, PT, followed by an interval of 65 degrees between a sequential pair of cam signals C1, (state 121);

(G) a missing tooth, PT, followed by an interval of 115 degrees between a sequential pair of cam signals C1, (state 123);

(H)) an interval of 115 degrees between a sequential pair of cam signals C1 followed by another interval of 90 degrees between a sequential pair of cam signals C1, (state 90);

(I) an interval of 90 degrees between a sequential pair of cam signals C1, (state 10);

(J) an interval of 115 degrees between a sequential pair of cam signals C1, followed by a missing tooth, PT, (state 95); and (K) a missing tooth by followed by an interval of 90 degrees between a sequential pair of cam signals C1, (state 122).

Thus, there are 11 unique patterns, each one being defined by a state.

Referring now to FIG. 10, after start up, Step 1000 the processor sets the register 60, FIG. 1 to an initialize state=1 and set a flag "first_cam=FALSE", Step 1001.

Next, in Step 1002, the processor waits for next signal from camshaft PT or crankshaft sensor signal C1.

Next, in Step 1004*a*, the processor determines whether there is a missing tooth. If not, a determination is made as to whether this is the first cam, Step 1004*b*. If it is, "first_cam" is TRUE and the process returns to Step 1002. If it is not the first cam, the process proceeds to Step 1004*d*. In Step 1004*d*, the CPU 52 calculates the interval, in teeth, between last two cam teeth and sets "ispan" as follows:

0 if 3.5<interval<5.5
1 if 5.5<interval<7.5
2 if 8<interval<10
3 if 10.5<interval<12.5
4 if 12.5<interval<14.5
id=ispan and the process proceeds to Step 1006.

In Step 1006, state=8*state=id. Then next in Step 1012, a search is made of Table IV for match between current state and state values listed in TABLE IV, Step 1012. If a match is not found, the process returns to Step 1002. If a match is found, the process proceeds through Steps 1014*a*, 1014*b* and 1016 as described above for steps 614*a*, 614*b* and 616, respectively in connection with FIG. 6

If, however, in Step 1004*a*, a missing tooth is detected, the CPU 52 increments mtcount by one, i.e., mtcount=mtcount+1, Step 1004*e*, and the process proceeds to Step 1004*f*.

In Step 1004*f*, the CPU 52 determines whether mtcount<2. If not, the engine crankshaft position is assumed to be at the principal tooth, Step 1004*g*. If, however, in Step 1004*f* it is determined that mtcount is <2, id=7 and the process proceeds through Steps 1006, 1012, 1013, 1014*a*, 1014*b* and 1016, as described above.

It should be noted that here a time processing unit or TPU 61 (FIG. 1) in the ECU 50 is used for counting the number of crankshaft wheel teeth since the start of engine rotation and detecting the crankshaft wheel's missing tooth. The TPU determines the position of the camshaft signals relative to the crankshaft signals. The CPU processes the crankshaft position indicia and position of the camshaft signals from the TPU. Thus, as described above, rotation of the crankshaft generates a pattern comprising the crankshaft signal and the camshaft signals. The CPU compares the generated pattern to a stored reference pattern for determining from such comparison the position of the crankshaft within the engine block.

More particularly, the generated pattern is converted by the processor into a corresponding digital word and wherein the stored reference is a reference digital word and wherein the processor compares the corresponding digital word with the reference digital word to determine the position of the crankshaft within the engine block.

A number of embodiments of the invention have been described. Nevertheless, it will be understood that various modifications may be made without departing from the spirit and scope of the invention. Accordingly, other embodiments are within the scope of the following claims.

What is claimed is:

1. An internal combustion engine having:

a crankshaft rotatable within an engine block of the engine;

at least one camshaft rotatable driven by the crankshaft;

wherein the crankshaft is fixed to a crankshaft wheel, such crankshaft wheel having a plurality of crankshaft wheel marks and at least one crankshaft position indicia;

wherein the camshaft is fixed to a camshaft wheel having a predetermined pattern of camshaft wheel marks;

- a crankshaft sensor, fixed to the engine block, for producing a crankshaft signal in response to detection of the crankshaft position indicia;
- a camshaft sensor, fixed to the engine block, for producing camshaft signals in response to detection of the camshaft wheel marks;
- wherein rotation of the crankshaft generates a pattern comprising the crankshaft signal and the camshaft signals; and
- a processor for comparing the generated pattern to a stored reference pattern for determining from such comparison the rotational position of the crankshaft with respect to top dead center of a piston as said piston reciprocates within the engine block.

2. The system recited in claim 1 wherein the generated pattern is converted by the processor into a corresponding digital word and wherein the stored reference is a reference digital word and wherein the processor compares the corresponding digital word with the reference digital word to determine the position of the crankshaft with respect to top dead center of the piston.

3. The system recited in claim 1 wherein the crankshaft wheel has a plurality of n regions disposed about the periphery of the wheel, where n is an integer, and wherein one of the n regions is absent a tooth and each one of the remaining (n-1) regions has a tooth, the (n-1) regions having the teeth providing the plurality of crankshaft wheel marks and the one of the n regions absent the tooth providing the at least one crankshaft position indicia.

4. A method for use with a n internal combustion engine having: a crankshaft rotatable within an engine block of the engine; at least one camshaft rotatable driven by the crankshaft; wherein the crankshaft is fixed to a crankshaft wheel, such crankshaft wheel having a plurality of crankshaft wheel marks and at least one crankshaft position indicia; wherein the camshaft is fixed to a camshaft wheel having a predetermined pattern of camshaft wheel marks; and a crankshaft sensor, fixed to the engine block; and, a camshaft sensor, fixed to the engine block, such method comprising:

- producing a crankshaft signal in response to detection of the crankshaft position indicia;
- producing camshaft signals in response to detection of the camshaft wheel marks;
- wherein rotation of the crankshaft generates a pattern comprising the crankshaft signal and the camshaft signals; and
- comparing the generated pattern to a stored reference pattern for determining from such comparison the rotational position of the crankshaft with respect to top dead center of a piston as said piston reciprocates within the engine block.

5. The method recited in claim 4 including converting the generated signals into a corresponding digital word and wherein the stored reference is a reference digital word and comparing the corresponding digital word with the reference digital word to determine the position of the crankshaft with respect to top dead center of the piston.

6. The method recited in claim 5 wherein the crankshaft wheel is provided with a plurality of n regions disposed about the periphery of the wheel, where n is an integer, and wherein one of the n regions is absent a tooth and each one of the remaining (n-1) regions has a tooth, the (n-1) regions having the teeth providing the plurality of crankshaft wheel marks and the one of the n regions absent the tooth providing the at least one crankshaft position indicia.

7. The method recited in claim 5 wherein each pattern is associated with a current state and wherein such current state is compared with a state stored in a state table, each pattern having a unique numerical value.

8. An article of manufacture comprising:

- a computer storage medium having a program encoded for operating an internal combustion engine having: a crankshaft rotatable within an engine block of the engine; at least one camshaft rotatable driven by the crankshaft; wherein the crankshaft is fixed to a crankshaft wheel, such crankshaft wheel having a plurality of crankshaft wheel marks and at least one crankshaft position indicia; wherein the camshaft is fixed to a camshaft wheel having a predetermined pattern of camshaft wheel marks; and a crankshaft sensor, fixed to the engine block; and, a camshaft sensor, fixed to the engine block, such medium having:
- code for operating the engine control unit to producing a crankshaft signal in response to detection of the crankshaft position indicia;
- code for producing camshaft signals in response to detection of the camshaft wheel marks, wherein rotation of the crankshaft generates a pattern comprising the crankshaft signal and the camshaft signals; and
- code for comparing the generated pattern to a stored reference pattern for determining from such comparison the rotational position of the crankshaft with respect to top dead center of a piston as said piston reciprocates within the engine block.

9. The article of manufacture recited in claim 8 wherein the computer storage medium is a semiconductor chip.

* * * * *